United States Patent [19]

Hickl et al.

[11] 4,216,015

[45] Aug. 5, 1980

[54] WEAR-RESISTANT IRON-NICKEL-COBALT ALLOYS

[75] Inventors: Anthony J. Hickl, Kokomo; Barry H. Rosof, Indianapolis, both of Ind.

[73] Assignee: Cabot Corporation, Kokomo, Ind.

[21] Appl. No.: 28,467

[22] Filed: Apr. 9, 1979

[51] Int. Cl.² ............................................. C22C 30/00
[52] U.S. Cl. ..................................... 75/134 F; 75/122; 75/171
[58] Field of Search ...................... 75/134 F, 122, 171

[56] References Cited

U.S. PATENT DOCUMENTS

| | | | |
|---|---|---|---|
| 2,617,725 | 11/1952 | Owens et al. | 75/128 |
| 3,167,424 | 1/1965 | Wick | 75/134 |
| 3,183,082 | 5/1965 | Konecsni | 75/134 F |
| 3,838,981 | 10/1974 | Foley | 29/182 |
| 3,980,473 | 9/1976 | Costin | 75/171 |
| 3,993,475 | 11/1976 | Harada et al. | 75/134 F |
| 4,050,927 | 9/1977 | Murakami et al. | 75/122 |
| 4,050,929 | 9/1977 | Murakami et al. | 75/171 |
| 4,075,999 | 2/1978 | Danis | 123/191 A |
| 4,110,110 | 8/1979 | Kondo et al. | 75/122 |
| 4,155,751 | 5/1979 | Herchenroeder | 75/122 |

*Primary Examiner*—L. Dewayne Rutledge
*Assistant Examiner*—Upendra Roy
*Attorney, Agent, or Firm*—Joseph J. Phillips; Jack Schuman

[57] ABSTRACT

Disclosed is a wear-resistant Fe-Ni-Co-base alloy that is suitable for use as coatings, sintered powder metal parts, and material for application of hard-facing depositions and/or plating. The alloy preferably contains about 11% cobalt, 24% nickel, 3% each molybdenum and tungsten, 26% chromium, 1.3% silicon, 1% carbon, about 0.5% boron, up to 4% modifying elements Mn, V, Ta, Cb, Cu, La, Zr, R-E metals, and the balance essentially iron plus incidental impurities.

8 Claims, No Drawings

WEAR-RESISTANT IRON-NICKEL-COBALT ALLOYS

This invention relates to iron-cobalt-nickel base alloys containing chromium, tungsten and/or molybdenum together with silicon, boron, and carbon. More particularly, the invention relates to alloys that are resistant to wear and are readily weldable.

Weldable wear-resistant alloys are in great demand in many industrial applications. Historically, such alloys for use as casting, powder metallurgy and hardfacing products were composed essentially of cobalt, chromium and tungsten. Because of the short supply and high costs of these elements, new alloys are avidly sought to fill the needs of industry.

Components of various industrial items (such as engines, machines and apparatus) that are subject to wear are constantly under study for improvement. For many years, improvements have been made in alloy compositions, coatings, heat treatments and designs to avoid excessive wear of such articles. In some cases, the article is made entirely of a wear-resistant alloy as a casting or sintered powder metal part or wrought product. In other cases, the article is made of a low cost and/or high strength base alloy and then coated (hardfaced) or plated with a wear-resistant alloy at the critical areas of wear. The coating or plating operation may be performed before or after the article is placed in service.

For many years, cobalt-base alloys were especially suited for such applications, for example, certain alloys manufactured under Cabot Corporation's registered trademark HAYNES STELLITE®. Recently, some nickel- and iron-base alloys have been developed to fill this need. Representative prior art alloys are described in Table 1. All compositions in this specification and claims are given in percent by weight (w/o) unless otherwise stated. These alloys are generally available in many forms and especially in the form of welding rods for use in hardfacing articles subjected to wear. The cobalt-base alloys are the HAYNES STELLITE® alloys that have been well known in the art for over 70 years. These alloys depend principally on their chromium and tungsten contents together with carbon to form metal carbides in a cobalt matrix for their outstanding properties. Alloy C-1 of Table 1 is a representative alloy of this class. Table 1 also lists some iron- and nickel-base alloys now available as wear-resistant articles.

U.S. Pat. No. 4,075,999, granted to L. J. Danis, discloses a series of nickel-base, wear-resistant coatings on components of internal combustion engines. The coatings of the Danis U.S. Pat. No. 4,075,999 consist of nickel-base alloys with critical contents of molybdenum, chromium and carbon to form metal carbides in the nickel matrix to obtain the desired engineering properties. Ally N-E in Table 1 is a typical coating composition of the Danis U.S. Pat. No. 4,075,999.

U.S. Pat. No. 2,699,993, granted to S. G. MacNeill, appears to be an early attempt to provide wear-resistant nickel-base alloys. The alloy disclosed in the MacNeill U.S. Pat. No. 2,699,993 is a low chromium, high tungsten and cobalt containing nickel-base alloy. Alloy N-42 in Table 1 is a typical alloy of the MacNeill U.S. Pat. No. 2,699,993.

U.S. Pat. No. 3,068,096, granted to J. K. Elbaum, discloses a nickel-base alloy with molybdenum, cobalt and tungsten each at 10% content. Alloy N-208 in Table 1 is an example of the alloy of U.S. Pat. No. 3,068,096.

U.S. Pat. No. 2,864,696, granted to J. W. Foreman, discloses a nickel-base alloy containing significant contents of copper and molybdenum, less than 25% chromium and 5 to 20% silicon.

These prior art patents cited above relate to articles that are within the same class of alloys as the alloy of the present invention. They are essentially nickel-base alloys containing chromium for use in wear-resistant applications.

Each of the prior art alloys, listed in Table 1, generally is characterized by a high degree of hardness; however, not all of the prior art alloys possess good hot hardness properties. Because of the various compositions, the prior art alloys vary in degree of corrosion resistance under a variety of corrosive media. Furthermore, the degree of wear resistance of the prior art alloy may vary depending upon the type of wear experienced, i.e., abrasive or adhesive wear.

Alloys of the prior art cited above generally contain, in appreciable amounts, one or more of the metals cobalt, tungsten, molybdenum and others. These metals have become extremely costly and/or are in short supply because of their strategic classification.

It is an object of this invention to provide an iron-nickel-cobalt-base alloy suitable for wear resistant applications.

It is another object of this invention to provide an FeNiCo-Base alloy suitable for use in the form of powder metallurgy parts, castings and articles for hardfacing depositions.

Other objectives and advantages will be apparent from the following descriptions, examples and claims.

To provide the objectives of this invention, an alloy has been provided as described in Table 2. It was discovered that best results were obtained: provided (1) iron content exceeds the nickel content; (2) iron content exceeds the cobalt content; and (3) the ratio of iron to cobalt plus nickel is within the range approximately 1:0.75 to 1.25.

Table 3 presents data obtained from tests to evaluate weldability characteristics. Alloy 188 was nickel-base with no significant iron and cobalt contents. Alloy 133 was nickel-base with 17.9% iron and 17.6% cobalt. These alloys did not perform well in welding by oxyacetylene methods. Alloys of this invention, Alloys 164 and 142, performed well. Note in alloy 188 the iron content did not exceed the nickel content as is preferred in the alloy of this invention. In alloy 133, the iron to total nickel plus cobalt ratio is about 1:2.5, and thereby, far exceeds approximate 1:1 as preferred by this invention. It appears that the proper proportions of iron, nickel and cobalt, as defined by this invention, are required for optimum welding characteristics.

The proportion of iron, nickel and cobalt, as disclosed by this invention appears to yield an alloy that has a stable face-centered-cubic (FCC) matrix. It is believed that an FCC matrix, as provided in the alloy of this invention, reduces the tendency for the alloy to crack.

The alloy of this invention as disclosed in Table 2 contains the basic elements that are known to be present in alloys of this class. However, it is the specific range and proportion of elements that contribute to the gist of the invention. Certain other modifying elements, i.e., vanadium, tantalum, columbium, manganese, copper, zirconium, lanthanum, rare earths (R/E), and the like, may also be present or may be added in the alloy of this invention to provide the benefits associated with such elements. It is expected that the experimental alloys disclosed in this specification contain most of these modifying elements adventitiously in various degrees of concentration depending upon the sources of raw material.

The balance of the alloy is iron plus incidental impurities that may be present in alloys of this class, i.e., sulfur, phosphorus and the like.

Molybdenum and tungsten are present in the alloy of this invention to provide hardness at room temperature and improved hot hardness and wear resistance at high temperatures. Table 4 presents data that show the effects of molybdenum and tungsten singly and in combination. The data show that molybdenum and tungsten are equivalents and, thus interchangeable. The added costs of molybdenum and tungsten content at the level of 12.7% (Alloy 153) does not appear to provide sufficient improvement to be justified. Furthermore, it is believed that total contents above about 10% may tend to result in undesirable and unstable phases in the microstructure. Thus, total molybdenum plus tungsten is limited to about 10% maximum.

Chromium is required in the alloy for resistance to corrosion, oxidation, solid solution strengthening of the matrix and for the formation of hard carbides and borides for wear resistance. Matrix chromium levels of between 16% and 22% are needed for corrosion and oxidation resistance. Chromium is the major metal species in the carbides and borides. Chromium, to form carbides, is needed to a maximum of ten times the weight percentage of carbon and boron. In alloys, this may be lessened by the presence of iron, nickel or cobalt in the carbides or borides. Total chromium should reflect both the chromium needed to form the necessary hard particles as well as the chromium needed to provide corrosion and oxidation resistance to the matrix.

Carbon is required to develop carbides in the alloy microstructure which resist wear due to abrasion or adhesion. Wear resistance is increased with increasing volume fraction of carbide. The ductility of the alloy is reduced with increasing carbide volume fraction. Carbon is needed at levels greater than 0.75 for satisfactory abrasive wear resistance and less than 1.50 for impact strength and crack resistance.

Boron is optical and may be added to improve wetting and molten metal fluidity during welding and to further limit boiling during oxyacetylene welding. Boron levels between approximately 0.2 to 0.7 will accomplish the improvement in weldability. All properties are not much affected by replacing boron with carbon but weldability is especially degraded in oxyacetylene. In alloys for use in non-welding applications or in arc welding, boron may be omitted.

Silicon is a critical element in the alloy of this invention. Silicon is present in the alloy to provide optimum welding and casting characteristics. It was found that silicon in amounts less than 0.60% resulted in alloys that were difficult to weld because of severe boiling of the weld or hardfacing deposits, presumably by the formation of undesirable gases in the deposit by some mechanism. At 0.68% silicon, the boiling problem is reduced somewhat; but at 0.70% silicon, there is no boiling. Thus, for alloys to be used in welding, a minimum of about 0.70% silicon is preferred.

It was further found that silicon contents over 1.5% tend to reduce the ductility of the alloy. For this reason, a maximum of about 1.5% silicon is recommended for this alloy. In some applications, for optimum results, it is recommended that silicon, boron and carbon should not be at their maximum levels simultaneously, and preferably less than 3.2% total.

Table 5 contains data from experimental alloys made with silicon and boron at various levels to show the effect of silicon and boron in this alloy system.

The oxyacetylene weldability is most affected by silicon and boron levels. Alloys such as 154-1 and 160 have unacceptably high levels of sparking and boiling which adversely affect the quality of the hardfacing and the rate at which it is deposited. Silicon at levels of 0.7% and greater result in significant reductions in sparking and boiling, so that sound deposits can be made by this technique as was shown in alloys 151-1 and 154-3. The addition of about 0.5% boron develops additional beneficial welding characteristics. Boron contributes improved fluxing and wetting characteristics to this system as was demonstrated in alloys 136, 142 and 152-2. It is recommended that alloys intended for oxyacetylene welding should contain a minimum of 0.75% silicon (and preferably 1-1.5%) and boron at about 0.5% for good welding quality.

The alloy of this invention is suitable for production in many forms. There are no problems in melting and producing the alloy. It has been readily cast in the form of investment castings, cast weld rod, and aspiration cast products. The alloy has been prepared in the form of powder for spray hardfacing processes, and for producing sintered metal parts and other powder metallurgy products. The alloy has been fashioned into various forms as material for welding and hardfacing, i.e., oxyacetylene, TIG, arc welding, plasma transferred arc and other known processes.

Table 6 presents examples of the alloy of this invention. In most cases the alloys were made by the aspiration casting process. Alloy 3644 was made in the form of powder. All other alloys were prepared as experimental heats then cast into various forms as required for testing.

Hardness values shown in Table 6 were made by Rockwell "C" scale hardness tester. Specimens were oxyacetylene hardfacing deposits of cast rod made of each alloy. The hardness of Alloy 3644 was obtained from plasma-arc hardfacing deposit made from the alloy in powder form.

The alloy was prepared in the form of remelt stock and then investment cast (lost-wax process). Castings were valve globes, rings and other machinery components. The castings have an excellent surface which requires little, if any, processing to finish the casting for use. Hardness of the "as cast" castings was found to be about 28 Rockwell "C" scale.

The alloy of this invention together with various other prior art alloys has been tested to obtain hot hardness properties. Table 7 presents results of the hot hardness tests. It appears that the alloy of this invention, alloy 134, has at least comparable hot hardness, especially at the 1200 and 1400 degree F. temperatures.

Hardness values at room temperature for these alloys are presented in Table 8.

Table 9 presents corrosion rates in mils per year (mpy) in various media for the alloy of this invention and prior art alloys. It appears the corrosion resistance of the alloy of this invention is particularly outstanding especially when compared with the nickel-base alloy.

The alloy of this invention has improved impact resistant characteristics, especially when compared to nickel-base alloys. Generally speaking, nickel- or iron-base alloys of this class have very low impact resistance obtained by the unnotched Charpy test method. The specimens, as tested, were undiluted depositions by oxyacetylene (O-A) and tungsten inert gas (TIG) processes.

TABLE 1
TYPICAL COMPOSITIONS OF PRIOR ART ALLOYS
in weight percent

| ALLOY | Ni | Cr | Mo | Fe | W | C | Si | Co | B | V |
|---|---|---|---|---|---|---|---|---|---|---|
| C-6 | 3* | 28 | 1* | 3* | 4 | 1.1 | 1.0 | Bal | — | — |
| C-1 | — | 30 | — | — | 12 | 2.5 | — | Bal | — | — |
| C-12 | — | 29 | — | 5.0 | 8 | 1.25 | — | Bal | — | — |
| N-41 | Bal | 12 | — | 3.0 | — | .35 | 3.5 | — | 2.5 | — |
| N-E | Bal | 29 | 5.0 | 3.0 | — | 2.5 | 1.0 | — | — | — |
| N-711 | Ni + Co/Bal | 27 | 10 | 23 | — | 2.7 | — | Ni + Co/Bal | — | — |
| N-42 | Bal | 14 | — | 2 max | 14 | .8 | .5 | 15 | 3.0 | — |
| N-208 | Bal | 26 | 10 | 12.5 | 10 | 1.4 | .7 | 10 | — | — |
| F-1016 | 10 | 25 | 5.5 | Bal | — | 1.8 | .8 | — | — | — |
| F-93 | — | 17 | 16 | Bal | — | 3 | — | 6.5 | — | 1.9 |
| CRM | — | 18 | 3.25 | Bal | 2.25 | 3.25 | 1.1 | 1.0 | — | 1.25 |

*Maximum

TABLE 2
ALLOYS OF THIS INVENTION
in weight percent (w/o)

| ELEMENT | BROAD RANGE | PREFERRED RANGE | TYPICAL RANGE |
|---|---|---|---|
| Co | 5 minimum | 5 minimum | 8.5–15 |
| Ni | up to 35 | 15–30 | 20–26 |
| Co + Ni | 25–40 | 30–37 | 30–37 |
| Mo | up to 10 | up to 10 | 2–4 |
| W | up to 10 | up to 10 | 2–4 |
| Mo + W | 4–10 | 4–10 | 4–8 |
| Cr | 20–33 | 22–30 | 22–28 |
| Si | .60–1.7 | .65–1.5 | .70–1.5 |
| C | .75–1.5 | .75–1.5 | .9–1.3 |
| B | up to 1 | up to .70 | .2–.7 |
| V + Ta + Cb + Mn + Cu + Zr + La + R/E* | up to 5 | up to 4 | up to 4 |
|  | — | Fe > Ni | — |
|  | — | Fe > Co | — |
|  | — | Fe:(Ni + Co) = 1:0.75 to 1.25 | — |
| Fe plus impurities | Bal | Bal | 28 minimum |

*R/E - Rare Earths

TABLE 3
EXPERIMENTAL ALLOYS

| ALLOY NO. | Fe | Ni | Co | Cr | Mo | W | Si | B | C | OXYACETYLENE WELDABILITY |
|---|---|---|---|---|---|---|---|---|---|---|
| 188 | 0.2 | 60.3 | 0.2 | 28.9 | 3.8 | 2.0 | 1.9 | 0.23 | 1.14 | Poor; boiling & sparking |
| 133 | 17.9 | 30.8 | 17.6 | 24.2 | 2.0 | 5.6 | 0.9 | 0.62 | 1.0 | Poor; some boiling & sparking |
| 164* | 32.8 | 22.7 | 9.9 | 24.6 | 3.1 | 3.5 | 1.1 | 0.40 | 1.3 | Good; no boil or spark |
| 142* | 33.5 | 27.2 | 6.1 | 24.6 | 3.0 | 3.0 | 0.8 | 0.5 | 1.0 | Good; no boil or spark |

*Alloys of this invention

TABLE 4
EFFECTS OF MOLYBDENUM AND TUNGSTEN

| ALLOY NO. | Fe | Co | Ni | Cr | Si | B | C | Mo | W | ROCKWELL-C HARDNESS** |
|---|---|---|---|---|---|---|---|---|---|---|
| 151-2* | BAL | 16.3 | 18.0 | 28.3 | 0.7 | 0.5 | 0.95 | 1.9 | 2.0 | 32 |
| 152* | BAL | 15.6 | 17.3 | 27.1 | 0.7 | 0.5 | 0.9 | 4.0 | 4.1 | 36 |
| 153 | BAL | 15.0 | 16.6 | 26.0 | 0.7 | 0.5 | 0.9 | 6.4 | 6.3 | 42 |
| 146* | BAL | 16.0 | 18.0 | 28.0 | 0.8 | 0.6 | .95 | 6.2 | 0.5 | 35 |
| 149* | BAL | 16.1 | 18.0 | 28.4 | 0.9 | 0.6 | 0.9 | 0.5 | 6.3 | 35 |

*Alloy of this invention
**Oxyacetylene Deposit on low carbon steel (about 1 to 2 foot-pound). Table 10 presents impact data

TABLE 5
EFFECT OF SILICON IN SELECTED ALLOYS

| ALLOY NO. | Fe | Co | Ni | Mo | W | Cr | Si | B | C | HARDNESS Rc | OXYACETYLENE WELDABILITY |
|---|---|---|---|---|---|---|---|---|---|---|---|
| 134* | 30.8 | 16.0 | 17.9 | 3.0 | 2.5 | 26.5 | .68 | .51 | 1.07 | 31 | Lt. spark, very light boil. No porosity. Good fluxing. |

TABLE 5-continued

EFFECT OF SILICON IN SELECTED ALLOYS

| ALLOY NO. | Fe | Co | Ni | Mo | W | Cr | Si | B | C | HARDNESS Rc | OXYACETYLENE WELDABILITY |
|---|---|---|---|---|---|---|---|---|---|---|---|
| 136* | 34.3 | 15.5 | 17.4 | 2.95 | 2.76 | 24.3 | .75 | .49 | .91 | 29 | No spark or boil. Very good wetting and fluxing action. |
| 142* | 33.5 | 6.1 | 27.2 | 2.95 | 3.01 | 24.6 | .76 | .50 | .96 | 25 | No spark or boil. Very good wetting and fluxing action. |
| 151-1* | 34.0 | 16.3 | 15.0 | 1.89 | 2.0 | 28.3 | .70 | .03 | .94 | 33 | Very Lt. spark and boil. Fair wetting. |
| 151-2* | 34.0 | 16.3 | 15.0 | 1.89 | 2.0 | 28.3 | .70 | .50 | .94 | 32 | Very lt. spark. No boil. Good wetting and fluxing action. |
| 154-1 | 32.3 | 16.2 | 15.2 | 3.2 | 2.4 | 28.6 | .40 | .002 | .89 | — | Boiling and sparking. Poor wetting. Porous deposit |
| 154-3* | 32.3 | 16.2 | 15.2 | 3.2 | 2.4 | 28.6 | .76 | .002 | .89 | — | Very light boiling and sparking. Fair wetting |
| 154-4* | 32.3 | 16.2 | 15.2 | 3.2 | 2.4 | 28.6 | 1.03 | .002 | .89 | — | No boiling or sparking. Good wetting. No porosity. |
| 154-5* | 32.3 | 16.2 | 15.2 | 3.2 | 2.4 | 28.6 | 1.34 | .002 | .89 | — | No boiling or sparking. Somewhat "stringy" melt off. |
| 160 | 32.9 | 9.9 | 23.6 | 2.4 | 3.0 | 25.2 | .54 | .26 | .97 | 30 | Boiling and sparking. Fair wetting. |

*Alloys of this invention.

TABLE 6

EXAMPLE ALLOYS OF THIS INVENTION (in w/o)

| ALLOY NO. | Fe | Co | Ni | Mo | W | Cr | Si | B | C | HARDNESS Rc |
|---|---|---|---|---|---|---|---|---|---|---|
| 134 | 30.8 | 16.0 | 17.9 | 3.0 | 2.5 | 26.5 | 0.68 | 0.51 | 1.07 | 31 |
| 136 | 34.3 | 15.5 | 17.4 | 2.95 | 2.76 | 24.3 | 0.75 | 0.49 | 0.91 | 29 |
| 137 | 34.3 | 15.5 | 17.4 | 2.95 | 2.76 | 26.4 | 0.75 | 0.49 | 0.91 | 27 |
| 138 | 34.3 | 15.5 | 17.4 | 2.95 | 2.76 | 28.6 | 0.75 | 0.49 | 0.91 | 29 |
| 139 | 33.6 | 10.8 | 22.4 | 2.98 | 2.95 | 24.5 | 0.75 | 0.50 | 0.94 | 26 |
| 140 | 33.6 | 10.8 | 22.4 | 2.98 | 2.95 | 26.8 | 0.75 | 0.50 | 0.94 | 27 |
| 141 | 33.6 | 10.8 | 22.4 | 2.98 | 2.95 | 29.3 | 0.75 | 0.50 | 0.94 | 30 |
| 142 | 33.5 | 6.1 | 27.2 | 2.95 | 3.01 | 24.6 | 0.76 | 0.50 | 0.96 | 25 |
| 143 | 33.5 | 6.1 | 27.2 | 2.95 | 3.01 | 27.0 | 0.76 | 0.50 | 0.96 | 29 |
| 144 | 33.5 | 6.1 | 27.2 | 2.95 | 3.01 | 29.4 | 0.76 | 0.50 | 0.96 | 28 |
| 145 | 31.6 | 16.0 | 15.0 | 6.2 | 0.5 | 28.6 | 0.80 | 0.04 | 0.95 | 33 |
| 146 | 31.6 | 16.0 | 18.0 | 6.2 | 0.5 | 28.6 | 0.80 | 0.64 | 0.95 | 35 |
| 147 | 31.6 | 16.0 | 18.0 | 6.2 | 0.5 | 28.6 | 1.30 | 0.64 | 0.95 | 35 |
| 148 | 31.6 | 16.1 | 14.9 | 0.5 | 6.25 | 28.4 | 0.89 | 0.004 | 0.92 | 32 |
| 149 | 31.6 | 16.1 | 18.0 | 0.5 | 6.25 | 28.4 | 0.89 | 0.60 | 0.92 | 35 |
| 150 | 31.6 | 16.1 | 18.0 | 0.5 | 6.25 | 28.4 | 1.39 | 0.60 | 0.92 | 36 |
| 151-1 | 34.0 | 16.3 | 15.0 | 1.89 | 2.0 | 28.3 | 0.70 | 0.03 | 0.94 | 33 |
| 151-2 | 34.0 | 16.3 | 18.0 | 1.89 | 2.0 | 28.3 | 0.70 | 0.50 | 0.94 | 32 |
| 152 | 34.0 | 16.3 | 18.0 | 3.98 | 4.1 | 28.3 | 0.70 | 0.50 | 0.94 | 36 |
| 154-3 | 32.3 | 16.2 | 15.2 | 3.2 | 2.4 | 28.6 | 0.76 | 0.002 | 0.89 | — |
| 154-4 | 32.3 | 16.2 | 15.2 | 3.2 | 2.4 | 28.6 | 1.03 | 0.002 | 0.89 | — |
| 154-5 | 32.3 | 16.2 | 15.2 | 3.2 | 2.4 | 28.6 | 1.34 | 0.002 | 0.89 | 33 |
| 156 | 33.0 | 11.0 | 22.6 | 3.7 | 1.8 | 25.4 | 0.92 | 0.002 | 0.84 | 28 |
| 157 | 30.9 | 10.9 | 22.7 | 2.9 | 3.8 | 25.7 | 0.87 | 0.25 | 1.04 | 33 |
| 161 | 32.0 | 9.7 | 23.4 | 2.8 | 2.9 | 25.5 | 0.76 | 0.75 | 1.04 | 30 |
| 162 | 33.2 | 9.8 | 23.1 | 3.0 | 3.5 | 24.4 | 0.99 | 0.45 | 1.29 | 32 |
| 163 | 33.0 | 9.8 | 22.8 | 3.0 | 3.5 | 24.5 | 1.07 | 0.44 | 1.25 | 30 |
| 164 | 32.8 | 9.9 | 22.7 | 3.1 | 3.5 | 24.6 | 1.10 | 0.40 | 1.33 | 33 |
| 165 | 32.9 | 9.9 | 22.8 | 3.2 | 3.6 | 24.6 | 0.97 | 0.40 | 1.36 | 30 |
| 185 | 29.4 | 15.4 | 17.6 | 3.5 | 3.3 | 27.5 | 1.16 | 0.006 | 1.01 | 28 |
| 187 | 30.6 | 11.9 | 20.5 | 3.1 | 3.6 | 26.7 | 1.06 | 0.12 | 1.01 | 30 |
| 186 | 31.6 | 14.9 | 17.7 | 3.2 | 3.6 | 25.6 | 1.23 | 0.13 | 1.37 | 30 |
| 5504 | Bal | 10.6 | 22.7 | 3.1 | 3.1 | 26.2 | 1.47 | 0.51 | 1.12 | 31 |
| 5505 | Bal | 10.9 | 22.8 | 3.0 | 3.4 | 26.3 | 1.39 | 0.51 | 1.06 | 29 |
| 5506 | Bal | 11.0 | 21.7 | 3.0 | 3.3 | 26.8 | 1.24 | 0.54 | 1.08 | 29 |
| 5507 | Bal | 9.9 | 23.1 | 3.7 | 3.0 | 26.8 | 1.08 | 0.34 | 1.13 | 30 |
| 3644 | Bal | 9.8 | 24.3 | 3.0 | 3.3 | 25.1 | 0.61 | 0.29 | 1.15 | 29 |

Rc = Rockwell "C" Scale

TABLE 7

HOT HARDNESS DATA
(TIG DEPOSITS)

| | HARDNESS - kg/mm² | | | |
|---|---|---|---|---|
| | 800° F. | 1000° F. | 1200° F. | 1400° F. |
| COBALT-BASE ALLOYS | | | | |
| Alloy No. C-6 | 300 | 275 | 260 | 185 |
| Alloy No. C-12 | 345 | 325 | 285 | 245 |
| Alloy No. C-1 | 510 | 465 | 390 | 230 |
| NICKEL-BASE ALLOYS | | | | |
| Alloy No. N-42 | 555 | 440 | 250 | 115 |
| ALLOY OF THIS INVENTION | | | | |
| Alloy No. 134 | 295 | 285 | 240 | 190 |

TABLE 8

HARDNESS AT ROOM TEMPERATURE

| | HARDNESS Rc | |
|---|---|---|
| | Oxyacetylene | TIG |
| COBALT-BASE ALLOYS | | |
| Alloy No. C-6 | 45 | 39 |
| Alloy No. C-12 | — | 44 |
| Alloy No. C-1 | 51 | 54 |
| NICKEL-BASE ALLOYS | | |
| Alloy No. N-42 | 56 | 57 |
| ALLOY OF THIS INVENTION | | |
| Alloy No. 134 | 31 | 32 |

TABLE 9

CORROSION TESTS ON SELECTED ALLOYS

| | CORROSION RATE - mpy* | | |
|---|---|---|---|
| | 30% Acetic | 5% Sulfuric | 65% Nitric |
| COBALT-BASE ALLOYS | | | |
| Alloy No. 6 | 0.4 | 0.3 | 3236 |
| Alloy No. 1 | 7 | 0.5 | 5374 |
| NICKEL-BASE ALLOYS | | | |
| Alloy No. N-42 | 665 | 1969 | 9288 |
| ALLOY OF THIS INVENTION | | | |
| Alloy No. 134 | 4 | 500 | 100 |

*mpy - mils per year

TABLE 10

IMPACT TEST RESULTS

| | UNNOTCHED CHARPY - Ft-lb. | |
|---|---|---|
| | TIG | Oxyacetylene |
| COBALT-BASE ALLOY | | |
| Alloy No. C-6 | 17 | 9 |
| Alloy No. C-12 | 7 | — |
| Alloy No. C-1 | 4 | 2 |
| NICKEL-BASE ALLOY | | |
| Alloy No. N-42 | 2 | 1 |
| ALLOY OF THIS INVENTION | | |
| Alloy No. 134 | 11 | 7 |

What is claimed is:

1. An alloy characterized by high wear resistance and suitable weldability consisting essentially of, in weight percent, at least 8.5 cobalt, up to 35 nickel, the total nickel plus cobalt from 25 to 40, up to 10 molybdenum, up to 10 tungsten, the total molybdenum plus tungsten from 4 to 10, 20 to 33 chromium, 0.60 to 1.7 silicon, 0.9 to 1.5 carbon, up to 1.0 boron, and the balance iron and incidental impurities.

2. The alloy of claim 1 containing up to 5 weight percent of at least one element from the group consisting of modifying elements from the group vanadium, tantalum, columbium, manganese, copper, zirconium, lanthanum, and rare earth metals.

3. The alloy of claim 1 as an article for welding and resistant to wear and impact.

4. The alloy of claim 1 wherein the cobalt plus nickel is 30 to 37, the chromium is 22 to 30, the silicon is 0.65 to 1.5, the boron is up to 0.70, the iron content exceeds each of the nickel content and cobalt content, and wherein the ratio of iron to nickel plus cobalt is 1 to about 0.75 to 1.25.

5. The alloy of claim 4 containing up to 4 weight percent of at least one element from the group consisting of modifying elements from the group vanadium, tantalum, columbium, manganese, copper, zirconium, lanthanum, and rare earth metals.

6. The alloy of claim 1 wherein the cobalt is 8.5 to 15, the nickel is 20 to 26, the cobalt plus nickel is 30 to 37, the molybdenum is 2 to 4, the tungsten is 2 to 4, the chromium is 22 to 28, the silicon is 0.7 to 1.5, the carbon is 0.9 to 1.3, the boron is 0.2 to 0.7, and the iron is at least 28.

7. The alloy of claim 6 containing up to 4 weight percent of at least one element from the group consisting of modifying elements from the group vanadium, tantalum, columbium, manganese, copper, zirconium, lanthanum, and rare earth metals.

8. The alloy of claim 1 in the form of a casting, sintered powder metal article, powder metal, or material for welding and hardfacing depositions.

* * * * *